United States Patent
Tan (10) Patent No.: US 11,589,119 B2
(45) Date of Patent: Feb. 21, 2023

(54) PSEUDO SEAMLESS SWITCHING METHOD, DEVICE AND MEDIA FOR WEB PLAYING DIFFERENT VIDEO SOURCES

(71) Applicant: SHANGHAI BILIBILI TECHNOLOGY CO., LTD., Shanghai (CN)

(72) Inventor: Zhaoxin Tan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/425,090

(22) PCT Filed: Dec. 16, 2019

(86) PCT No.: PCT/CN2019/125523
§ 371 (c)(1),
(2) Date: Jul. 22, 2021

(87) PCT Pub. No.: WO2020/151399
PCT Pub. Date: Jul. 30, 2020

(65) Prior Publication Data
US 2022/0109915 A1    Apr. 7, 2022

(30) Foreign Application Priority Data
Jan. 23, 2019 (CN) .................. 201910061516.X (51) Int. Cl.
*H04N 21/462* (2011.01)
*H04N 21/43* (2011.01)
(Continued)

(52) U.S. Cl.
CPC ..... *H04N 21/4622* (2013.01); *H04N 21/4302* (2013.01); *H04N 21/44004* (2013.01); *H04N 21/44204* (2013.01)

(58) Field of Classification Search
CPC .......... H04N 21/4622; H04N 21/4302; H04N 21/44004; H04N 21/44204
See application file for complete search history.

(56) References Cited

U.S. PATENT DOCUMENTS 5,982,436 A * 11/1999 Balakrishnan ... H04N 21/44016
375/E7.22
10,567,489 B2 * 2/2020 Seastrom .............. H04L 65/605
(Continued)

FOREIGN PATENT DOCUMENTS

CN    102291599 A    12/2011
CN    102905188 A    1/2013
(Continued)

OTHER PUBLICATIONS

International Patent Application No. PCT/CN2019/125523; Int'l Search Report; dated Mar. 20, 2020;3 pages.

*Primary Examiner* — Fernando Alcon
(74) *Attorney, Agent, or Firm* — BakerHostetler (57) ABSTRACT

The present invention provides a method, a device and a computer-readable medium for a pseudo seamless switch between different video sources and belongs to a field of the Internet technology. According to the method, a device and a computer-readable medium for a pseudo seamless switch between different video sources of the present invention, when a video source needs to be switched, the Web browser first establishes a target video source playback instance; determines a synchronization duration based on a playing state of an original video source and a network state; after the synchronization duration, the Web browser switches to the target video source playback instance to achieve seamless switching between various video sources, so as to effectively avoid blocking during playback and greatly improve user experience. And the method, device and computer-readable medium for a pseudo seamless switch (Continued)

between different video sources of the present invention have the advantages of simple implementation, low application cost and wide application range.

15 Claims, 3 Drawing Sheets

(51) Int. Cl.
  *H04N 21/44* (2011.01)
  *H04N 21/442* (2011.01)

(56) References Cited

U.S. PATENT DOCUMENTS

| | | | |
|---|---|---|---|
| 10,779,042 B1* | 9/2020 | Gupta | H04N 21/26258 |
| 2002/0133247 A1* | 9/2002 | Smith | H04N 7/163 |
| | | | 370/360 |
| 2005/0267891 A1* | 12/2005 | Shimizu | G06F 12/023 |
| 2007/0294439 A1* | 12/2007 | Tsai | G06F 13/362 |
| | | | 710/57 |
| 2008/0141317 A1* | 6/2008 | Radloff | H04N 21/4532 |
| | | | 725/87 |
| 2016/0337426 A1* | 11/2016 | Shribman | H04L 65/612 |
| 2017/0188072 A1* | 6/2017 | Major | H04N 21/23116 |
| 2017/0359607 A1 | 12/2017 | Li et al. | |
| 2019/0387271 A1* | 12/2019 | Ojiro | H04N 21/26258 |
| 2020/0374586 A1* | 11/2020 | Kumar | H04N 21/41407 |

FOREIGN PATENT DOCUMENTS

| | | |
|---|---|---|
| CN | 103533437 A | 1/2014 |
| CN | 103997680 A | 8/2014 |
| CN | 104219579 A | 12/2014 |
| CN | 104768062 A | 7/2015 |
| CN | 104967884 A | 10/2015 |
| CN | 105791987 A | 7/2016 |
| CN | 105916008 A | 8/2016 |
| CN | 106375836 A | 2/2017 |
| CN | 108055250 A | 5/2018 |
| CN | 109246462 A | 1/2019 |

* cited by examiner

Fig. 6

PSEUDO SEAMLESS SWITCHING METHOD, DEVICE AND MEDIA FOR WEB PLAYING DIFFERENT VIDEO SOURCES

CROSS-REFERENCE TO RELATED APPLICATION

The present application is a national phase application of PCT international patent application No. PCT/CN2019/125523, filed on Dec. 16, 2019, which claims priority to Chinese patent application No. 201910061516.X, filed on Jan. 23, 2019. The entire disclosure of the above-identified application is hereby incorporated by reference herein and made a part of this specification.

TECHNICAL FIELD

The embodiments of the present invention relate to a field of the Internet technology, more particularly to a field of network video technology, and specifically to refer to a pseudo seamless switching method, a device and a computer-readable media for Web playing between different video sources.

BACKGROUND

Video Website is a popular content Website at present. Web browser is one of the main ways to visit video Websites. At present, there are three kinds of video source formats commonly used in the network: DASH (Dynamic Adaptive Streaming over HTTP) format, fly format and mp4 format. The best user experience is the DASH format, followed by the fly format and the mp4 format. Because of level of support of different browser platforms for video source format, usability of some browsers is just the opposite, for example, the mp4 format is better than the fly format, and the DASH format is the most unsupported.

Figure 3:
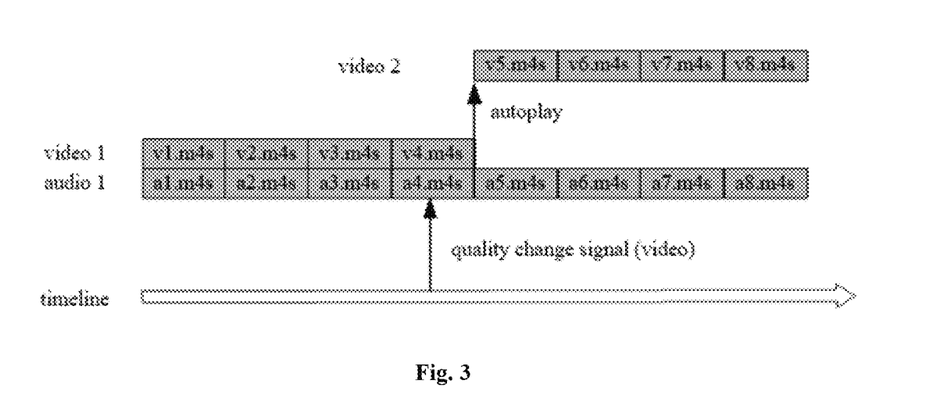
FIG. 3 illustrates a diagram of seamless switching thread of video in DASH format.

During the actual use, according to different network states or users' viewing needs, the resolution usually needs to be switched, and different resolutions often need to switch the video source format. When gop (group of picture) is not aligned, different video source formats can not be switched directly, only the DASH format itself can be switched seamlessly. The DASH format switch thread is shown in FIG. 3.

Therefore, how to provide a seamless switching method between various video sources, to avoid blocking during playback, and improve user experience become an urgent problem in the field.

SUMMARY

The purpose of the present invention is to overcome above disadvantages of the prior art, and provide a pseudo seamless switching method, device and computer-readable medium for Web playing different video sources, which can realize seamless switching between various video sources, avoid blocking during playback, and improve user experience.

In order to realize the above purpose, the pseudo seamless switching method for Web playing different video sources in this present invention includes the following steps:

(1) a Web browser playing a first video source of a video;
(2) the Web browser receiving a switching video source instruction;
(3) the Web browser establishing a second video source playback instance of the video;
(4) the Web browser determining synchronization time according to a playing state of the first video source and a running state of the second video source playback instance;
(5) after the synchronization time, the Web browser switching to the second video source playback instance, and stopping playing the first video source.

In the pseudo seamless switching method for Web playing different video sources, the first video source and the second video source are any of DASH format, fly format and mp4 format.

In the pseudo seamless switching method for Web playing different video sources, the step (4) specifically comprises the following steps:

(41) determining whether a bandwidth of the Web browser is sufficient according to the following formula, and a remaining buffer length of the first video source is long, $$B_2/8 \times L/S \times N + T \le F$$

wherein, $B_2$ is a total average code rate of the second video source; L is a length of data required for the second video source to acquire video data to be able to play; S is a speed of the Web browser to acquire the data; N is a speed safety value of acquiring data; T is time required for the Web browser to start acquiring data; F is the remaining buffer length of the first video source;

if yes, determining that the synchronization time is: $B_2/8 \times L/S \times N + T$;

if not, step (42) is executed;

(42) determining whether the bandwidth of the Web browser is sufficient according to the following formula, and the remaining buffer length of the first video source is short, $$B_2/8 \times L/S \times N + T > F$$

and $$(B_2 + B_1)/8 \le S/N_2$$

wherein, $B_1$ is a total average code rate of the first video source, $N_2$ is a speed safety value of data of two video sources obtained by the Web browser;

if yes, determining that the synchronization time is: $(B_2 + B_1)/8 \times L/S \times N + T$; if not, step (43) is executed;

(43) determining that the synchronization time is: $B_2/8 \times L/S \times N + T$.

In the pseudo seamless switching method for Web playing different video sources, the step (2) specifically comprises:

the Web browser the playing state of the first video source in real time, and automatically generating the switching video source instruction according to a detection result.

In the pseudo seamless switching method for Web playing different video sources, the step (2) specifically comprises:

generating a corresponding switching video source instruction by a user operation received by the Web browser.

The present invention further provides a pseudo seamless switching method for Web playing different video sources, the method includes the following steps:

(A) a Web browser obtaining a first video source of a video from a server, and playing;
(B) the Web browser receiving a switching video source instruction;
(C) the Web browser obtaining a second video source of the video from the server, and establishing a second video source playback instance;
(D) the Web browser determining synchronization time according to a playing state of the first video source and a network state between the Web browser and the server;

(E) after the synchronization time, the Web browser switching to the second video source playback instance, and stopping playing the first video source.

In the pseudo seamless switching method for Web playing different video sources, the first video source and the second video source are any of DASH format, fly format and mp4 format.

In the pseudo seamless switching method for Web playing different video sources, the step (D) specifically comprises the following steps:

(D1) determining whether a network speed between the Web browser and the server is sufficient according to the following formula, and a remaining buffer length of the first video source is long, $$B_2/8 \times L/S \times N + T \leq S$$

wherein, $B_2$ is a total average code rate of the second video source; L is a length of data required for the second video source to acquire video data to be able to play; S is a speed of the Web browser to acquire the data; N is a speed safety value of acquiring data; T is time required for the Web browser to start acquiring data; F is the remaining buffer length of the first video source;

if yes, determining that the synchronization time is: $B_2/8 \times L/S \times N + T$;

if not, step (D2) is executed;

(D2) determining whether the network speed between the Web browser and the server is sufficient according to the following formula, and the remaining buffer length of the first video source is short, $$B_2/8 \times L/S \times N + T > F$$

and $$(B_2 + B_1)/8 \leq S/N_2$$

wherein, $B_1$ is a total average code rate of the first video source, $N_2$ is a speed safety value of data of two video sources obtained by the Web browser;

if yes, determining that the synchronization time is: $(B_2 + B_1)/8 \times L/S \times N + T$;

if not, step (D3) is executed;

(D3) determining that the synchronization time is: $B_2/8 \times L/S \times N + T$.

This present invention further provides a computer-readable storage medium, storing computer programs executed by a processor, when the computer programs are executed by a processor, the pseudo seamless switching method for Web playing different video sources is realized.

This present invention further provides a pseudo seamless switching device for Web playing different video sources, which comprises a processor and a memory, wherein the memory stores computer programs, when the computer programs are executed by the processor, the pseudo seamless switching method for Web playing different video sources is realized.

The pseudo seamless switching method, device and computer-readable medium for Web playing different video sources are adopted. In this method, when it is necessary to switch a video source, the web browser first establishes a target video source playback instance, and determines the synchronization time of the two according to the playing state of the original video source and network state of the Web browser; after the synchronization time, the Web browser switches to the target video source playback instance, to achieve seamless switching between various video sources, so as to effectively avoid blocking during playback and greatly improve user experience. And the pseudo seamless switching method, device and computer-readable medium for Web playing different video sources of the present invention have the advantages of simple implementation, low application cost and wide application range.

DETAILED DESCRIPTION OF ILLUSTRATIVE EMBODIMENTS

In order to be able to understand the technical content of the present invention more clearly, the following embodiments are particularly described.

Figure 1:
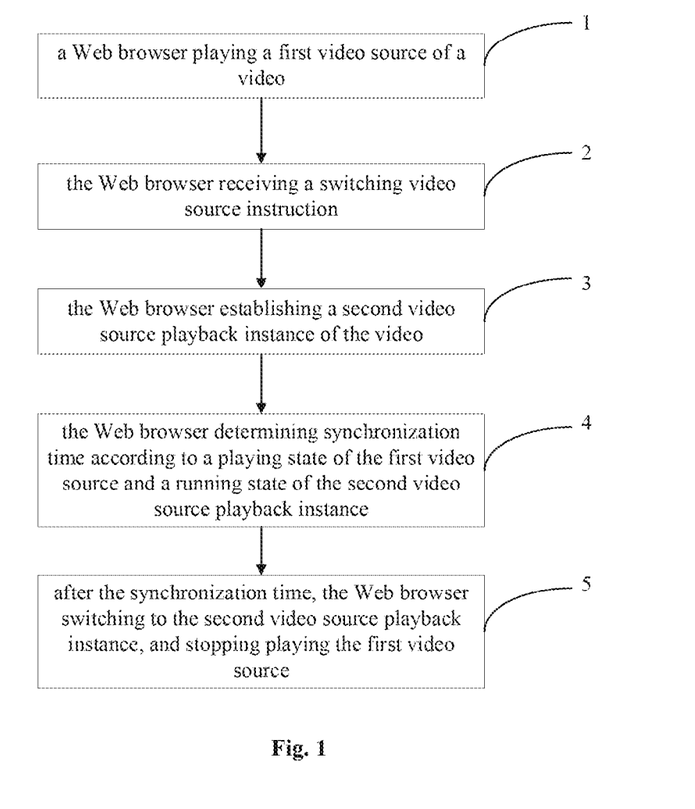
FIG. 1 illustrates a flowchart of steps of an embodiment of a pseudo seamless switching method for Web playing different video source of the present invention.

Please refer to FIG. 1, it is a flowchart of steps of an embodiment of a pseudo seamless switching method for Web playing different video source of the present invention.

In one embodiment, the pseudo seamless switching method for Web playing different video sources includes the following steps:

(1) a Web browser playing a first video source of a video;

(2) the Web browser receiving a switching video source instruction;

(3) the Web browser establishing a second video source playback instance of the video;

(4) the Web browser determining synchronization time according to a playing state of the first video source and a running state of the second video source playback instance;

(5) after the synchronization time, the Web browser switching to the second video source playback instance, and stopping playing the first video source.

The first video source and the second video source are any of DASH format, fly format and mp4 format.

In one preferred embodiment, the step (4) specifically includes the following steps:

(41) determining whether a bandwidth of the Web browser is sufficient according to the following formula, and a remaining buffer length of the first video source is long, $$B_2/8 \times L/S \times N + T \leq F$$

wherein, $B_2$ is a total average code rate of the second video source; L is a length of data required for the second video source to acquire video data to be able to play; S is a speed of the Web browser to acquire the data; N is a speed safety value of acquiring data; T is time required for the Web browser to start acquiring data; F is the remaining buffer length of the first video source;

if yes, determining that the synchronization time is: $B_2/8 \times L/S \times N+T$;

if not, step (42) is executed;

(42) determining whether the bandwidth of the Web browser is sufficient according to the following formula, and the remaining buffer length of the first video source is short, $$B_2/8 \times L/S \times N+T > F$$

and $$(B_2+B_1)/8 \leq S/N_2$$

wherein, $B_1$ is a total average code rate of the first video source, $N_2$ is a speed safety value of data of two video sources obtained by the Web browser;

if yes, determining that the synchronization time is: $(B_2+B_1)/8 \times L/S \times N+T$;

if not, step (43) is executed;

(43) determining that the synchronization time is: $B_2/8 \times L/S \times N+T$.

In a more selective embodiment, the step (2) may be:

the Web browser the playing state of the first video source in real time, and automatically generating the switching video source instruction according to a detection result. To realize automatic switching of the video source (resolution).

Or, the step (2) may also be:

generating a corresponding switching video source instruction by a user operation received by the Web browser. To realize manual switching of the video source (resolution).

Figure 2:
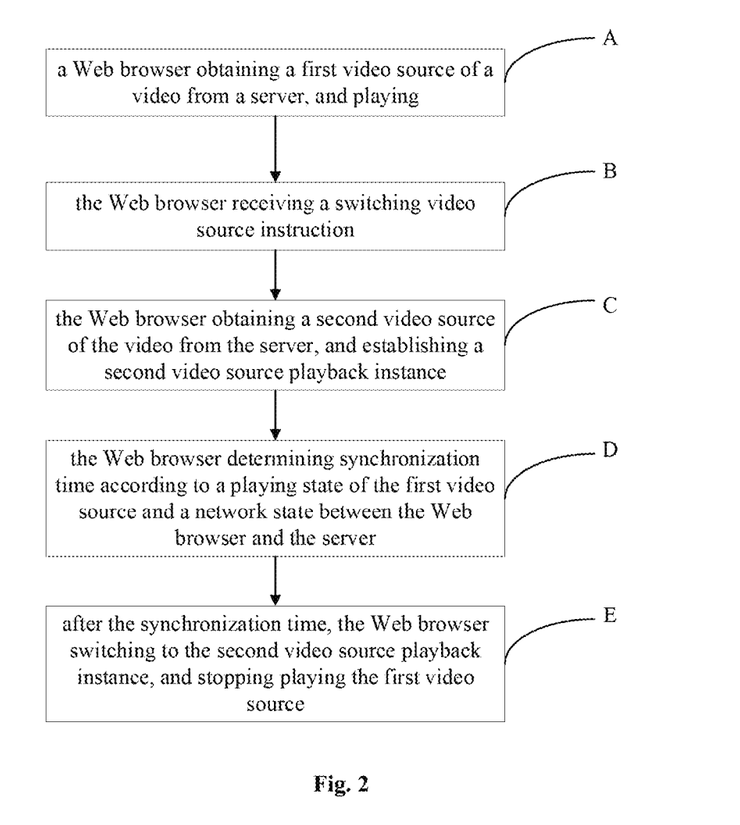
FIG. 2 illustrates a flowchart of steps of an embodiment of the pseudo seamless switching method for Web playing different video source of the present invention.

The present invention also provides a pseudo seamless switching method for Web playing different video sources, in one embodiment, as shown in FIG. 2, the following steps are included:

(A) a Web browser obtaining a first video source of a video from a server, and playing;

(B) the Web browser receiving a switching video source instruction:

(C) the Web browser obtaining a second video source of the video from the server, and establishing a second video source playback instance;

(D) the Web browser determining synchronization time according to a playing state of the first video source and a network state between the Web browser and the server;

(E) after the synchronization time, the Web browser switching to the second video source playback instance, and stopping playing the first video source.

Wherein, the first video source and the second video source are any of DASH format, fly format and mp4 format.

In one preferred embodiment, the step (D) specifically includes the following steps:

(D1) determining whether a network speed between the Web browser and the server is sufficient according to the following formula, and a remaining buffer length of the first video source is long, $$B_2/8 \times L/S \times N+T \leq F$$

wherein, $B_2$ is a total average code rate of the second video source; L is a length of data required for the second video source to acquire video data to be able to play; S is a speed of the Web browser to acquire the data; N is a speed safety value of acquiring data; T is time required for the Web browser to start acquiring data; F is the remaining buffer length of the first video source;

if yes, determining that the synchronization time is: $B_2/8 \times L/S \times N+T$;

if not, step (D2) is executed:

(D2) determining whether the network speed between the Web browser and the server is sufficient according to the following formula, and the remaining buffer length of the first video source is short, $$B_2/8 \times L/S \times N+T > F$$

and $$(B_2+B_1)/8 \leq S/N_2$$

wherein, $B_1$ is a total average code rate of the first video source, $N_2$ is a speed safety value of data of two video sources obtained by the Web browser;

if yes, determining that the synchronization time is: $(B_2+B_2)/8 \times L/S \times N+T$;

if not, step (D3) is executed;

(D3) determining that the synchronization time is: $B_2/8 \times L/S \times N+T$.

The present invention also provides a pseudo seamless switching device for Web playing different video sources and a computer-readable storage medium, the device includes a processor and a memory. The memory is the computer-readable storage medium, storing computer programs. When the computer programs are executed by the processor, the pseudo seamless switching method for Web playing different video sources described in the above embodiment is realized.

In actual applications, the pseudo seamless switching method for Web playing different video sources of the present invention is described by the following embodiment.

Embodiment 1

User's network speed supports seamless switching, and remaining of the first video source supports the user to pull stream a new video source (download target video source data) to playing-enough data and then play (that is, just new video source data needs to be downloaded).

That is, the user's network speed is sufficient, and a remaining buffer length of original video is long enough.

Then $B_2/8 \times L/S \times N+T \leq F$, switch time is $B_2/8 \times L/S \times N+T$.

Take the user switches a resolution from 1080P to 720P as an example, 1. a total average code rate of the original video (audio+video) $B_1$ (kbps)=2000

2. a total average code rate of a new video (audio+video) $B_2$ (kbps)=4000

3. a remaining buffer length of the original video F(s)=5

4. an average download speed of users S(k/s)=600

5. average time for users to establish a connection T(s)=0.2

6. safety value (an average value set for preventing the network speed from not reaching the average download speed) N=1.5

7. a new video stream is pulled to a enough data length for play L(s)=2

$$B_2/8 \times L/S \times N+T \leq F$$

4000/8×2/600×1.5+0.2=2.6<5, the above requirements are met.

Figure 4:
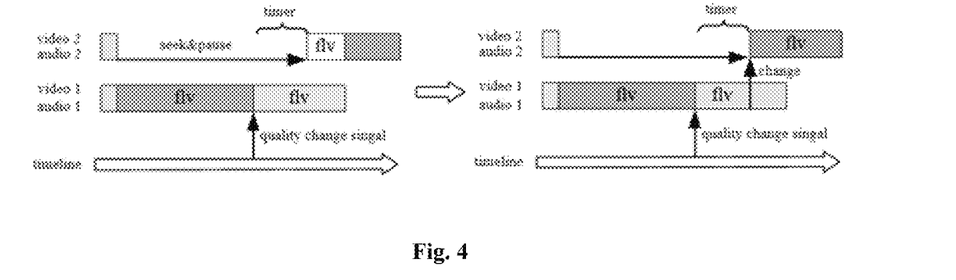
FIG. 4 illustrates a diagram of seamless switching thread of the pseudo seamless switching method for Web playing different video source of the present invention in first state.

A seamless switching thread is shown in FIG. 4, seamless switching time is to complete the switching after the new video starts to pull streaming about 2.6 s (subject to the actual completion state), a seamless switching control logic is used.

In this state, the user's network speed is sufficient, and the remaining buffer length of the original video is large, at this time, the seamless switching is supported, and the remaining part of the original video supports the user to pull the new stream to enough data for play and then play.

Embodiment 2

The user's network speed supports seamless switching, but a period of time may need to be prepared, that is, seamless switching of two streams needs to be pulled at the same time (original video source data and target video source data need to be downloaded at the same time).

The common scene is that the user's network speed is sufficient, and two channels of similar definition switch to each other, but the remaining buffer length of the original video is very small. Then it meets conditions $B_2/8 \times L/S \times N+T>F$ and $(B_2+B_2)/8 \leq S/N_2$, the synchronization time is: $(B_2+B_1)/8 \times L/S \times N+T$;

Take the user switches a resolution from 720P to 1080P as an example, the network speed is sufficient, but the buffer of original video source is insufficient.

1. a total average code rate of the original video (audio+video) $B_1$ (kbps)=1000
2. a total average code rate of a new video (audio+video) $B_2$ (kbps)=4000
3. a remaining buffer length of the original video F(s)=1
4. an average download speed of users S(k/s)=1000
5. average time for users to establish a connection T(s)=0.2
6. download safety value (an average value set for preventing the network speed from not reaching the average download speed) N=1.5
7. safety value of two-channel pull streams (in some cases, the speed is enough to pull two-channel streams, but it may be very slow, and it also needs to be controlled) $N_2$=1.2
8. a new video stream is pulled to a data length to play enough L(s)=2

$$B_2/8 \times L/S \times N+T>F$$

$$4000/8 \times 2/1000 \times 1.5+0.2=1.7>1$$

and $(B_2+B_1)/8 \leq S/N_2$ $$(4000+1000)/8=625<833$$

then the seamless switching time is:

$$(B_2+B_1)/8 \times L/S \times N+T$$

$$(4000+1000)/8 \times 2/1000 \times 1.5+0.2=2.075$$

Figure 5:
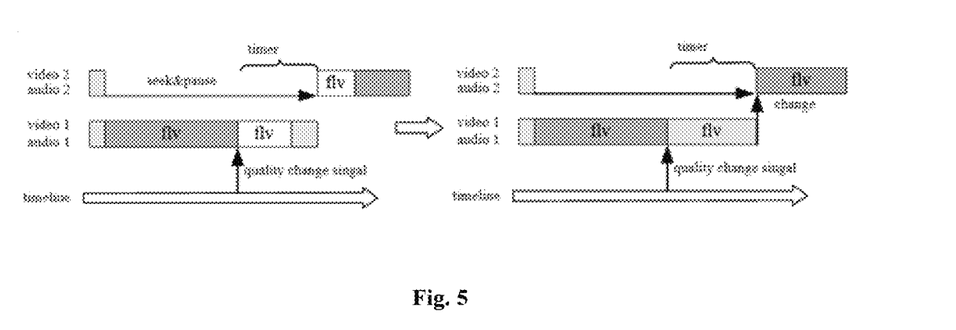
FIG. 5 illustrates a diagram of seamless switching thread of the pseudo seamless switching method for Web playing different video source of the present invention in second state.

A seamless switching thread is shown in FIG. 5, seamless switching can be carried out after after two pull streams start to playback about 2.075 s.

In this state, the user's network speed is sufficient, two channels of similar definition switch to each other, but the remaining buffer length of the original video is very small, so the seamless switching can be supported, but it may take a period of time to prepare (seamless switching of pulling two streams at the same time).

Embodiment 3

The user's network speed does not support seamless switching, that is, the seamless switching is impossible.

The common scene is switching a definition from low definition to high definition, but the user's download speed and the remaining buffer length are not enough to support conditions of the seamless switching, at this time, the seamless switching can not be adopted.

The conditions of the seamless switching is $B_2/8 \times L/S \times N+T>F$ and $(B_2+B_1)/8>S/N_2$, blocking switching time is $B_2/8 \times L/S \times N+T$ Take the user switches a definition from a fluent definition to 1080P as an example, 1. a total average code rate of the original video (audio+video) $B_1$ (kbps)=400
2. a total average code rate of a new video (audio+video) $B_2$ (kbps)=4000
3. a remaining buffer length of the original vide F(s)=2
4. an average download speed of users S(k/s)=200
5. average time for users to establish a connection T(s)=0.2
6. safety value (an average value set for preventing the network speed from not reaching the average download speed) N=1.5
7. safety value of two-channel pull streams (in some cases, the speed is enough to pull two-channel streams, but it may be very slow, and it also needs to be controlled) $N_2$=1.2
8. a new video stream is pulled to an enough data length to play L(s)=2

$$B_2/8 \times L/S \times N+T>F$$

$$4000/8 \times 2/200 \times 1.5+0.2=7.7>2$$

$$(B_2+B_1)/8>S/N_2$$

$$(4000+400)/8=550>200/1.2=166$$

Figure 6:
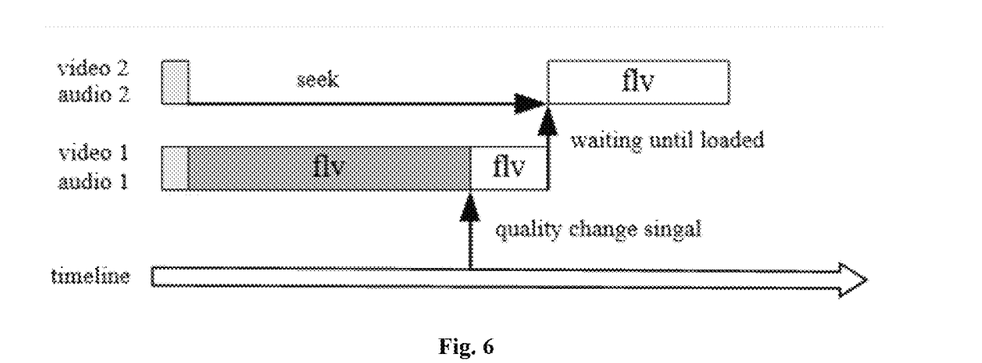
FIG. 6 illustrates a diagram of seamless switching thread of the pseudo seamless switching method for Web playing different video source of the present invention in third state.

Buffer switching time is $B_2/8 \times L/S \times N+T=7.7$ s, then a seamless switching thread is shown in FIG. 6, about 7.7 s for blocking is taken to switch to a definition of 1080p.

In this state, the user's network speed does not support seamless switching. The common scene is to switch the definition from low definition to high definition, but the user's download speed and the remaining buffer length are not enough to support conditions of the seamless switching, at this time, the seamless switching can not be adopted, and a pull stream with low definition stops and waits until a high definition stream is completed.

During the actual use, it is necessary to determine whether the above embodiments are satisfied in turn, that is, conditions of embodiment 1 is satisfied as far as possible, and only the target video source data technology needs to be switched seamlessly next week.

The pseudo seamless switching method, device and computer-readable medium for Web playing different video sources are adopted. In this method, when it is necessary to switch a video source, the web browser first establishes a target video source playback instance, and determines the synchronization time of the two according to the playing state of the original video source and network state; after the synchronization time, the Web browser switches to the target video source playback instance, to achieve seamless switching between various video sources, so as to effectively avoid blocking during playback and greatly improve user experience. And the pseudo seamless switching method, device and computer-readable medium for Web playing different video sources of the present invention have the advantages of simple implementation, low application cost and wide application range.

In this specification, the present invention has been described with reference to its specific embodiments. However, it is clear that various modifications and changes can still be made without departing from the spirit and scope of the present invention. Therefore, the specification and drawings shall be considered as illustrative rather than restrictive.

What is claimed is:

1. A method for a pseudo seamless switch between different video sources, comprising:
   playing a first video source of a video via a Web browser;
   receiving an instruction of switching to a second video source of the video;
   establishing a playback instance of the second video source of the video;
   determining a synchronization duration based on a playing state of the first video source and a running state of the playback instance of the second video source, wherein the determining a synchronization duration based on a playing state of the first video source and a running state of the playback instance of the second video source further comprises:
      determining whether a first formula as follows is satisfied based at least in part on a bandwidth associated with the Web browser and a remaining buffer length of the first video source, $$B_2/8 \times L/S \times N + T \leq F$$

wherein $B_2$ represents a total average code rate of the second video source, L represents a length of data required to acquire so as to be able to play the second video source, S represents a speed of the Web browser to acquire the data, N represents a speed safety value of acquiring the data, T represents a time period required for the Web browser to establish a connection so as to start acquiring the data, F represents the remaining buffer length of the first video source, and
   in response to a determination that the first formula is satisfied, determining that the synchronization duration is equal to $B_2/8 \times L/S \times N + T$; and
   switching to the playback instance of the second video source and stopping playing the first video source after the synchronization duration.

2. The method of claim 1, wherein the first video source and the second video source are in any format among a DASH (Dynamic Adaptive Streaming over HTTP) format, a flv (Flash Video) format, and a mp4 (MPEG-4) format.

3. The method of claim 1, wherein the receiving an instruction of switching to a second video source of the video further comprises:
   automatically generating the instruction of switching to the second video source based on detecting the playing state of the first video source in real time.

4. The method of claim 1, wherein the receiving an instruction of switching to a second video source of the video further comprises:
   generating the instruction of switching to the second video source based on user input received by the Web browser.

5. A non-transitory computer-readable storage medium, storing computer programs, when the computer programs are executed by a processor, the computer programs cause the processor to perform operations comprising:
   playing a first video source of a video via a Web browser;
   receiving an instruction of switching to a second video source of the video;
   establishing a playback instance of the second video source;
   determining a synchronization duration based on a playing state of the first video source and a running state of the playback instance of the second video source, wherein the determining a synchronization duration based on a playing state of the first video source and a running state of the playback instance of the second video source further comprises:
      determining whether a first formula as follows is satisfied based at least in part on a bandwidth associated with the Web browser and a remaining buffer length of the first video source, $$B_2/8 \times L/S \times N + T \leq F$$

wherein $B_2$ represents a total average code rate of the second video source, L represents a length of data required to acquire so as to be able to play the second video source, S represents a speed of the Web browser to acquire the data, N represents a speed safety value of acquiring the data, T represents a time period required for the Web browser to establish a connection so as to start acquiring the data, F represents the remaining buffer length of the first video source, and
   in response to a determination that the first formula is satisfied, determining that the synchronization duration is equal to $B_2/8 \times L/S \times N + T$; and
   switching to the playback instance of the second video source and stopping playing the first video source approximately at an end of the synchronization duration.

6. A device for a pseudo seamless switch between different video sources, which comprises a processor and a memory, wherein the memory stores computer programs, when the computer programs are executed by the processor, the computer programs cause the processor to perform operations comprising:
   playing a first video source of a video via a Web browser;
   receiving an instruction of switching to a second video source of the video;
   establishing a playback instance of the second video source;
   determining a synchronization duration based on a playing state of the first video source and a running state of the playback instance of the second video source, wherein the determining a synchronization duration based on a playing state of the first video source and a running state of the playback instance of the second video source further comprises:
      determining whether a first formula as follows is satisfied based at least in part on a bandwidth associated with the Web browser and a remaining buffer length of the first video source, $$B_2/8 \times L/S \times N + T \leq F$$

wherein $B_2$ represents a total average code rate of the second video source, L represents a length of data required to acquire so as to be able to play the second video source, S represents a speed of the Web browser to acquire the data, N represents a speed safety value of acquiring the data, T represents a time period required for the Web browser to establish a connection so as to start acquiring the data, F represents the remaining buffer length of the first video source, and
   in response to a determination that the first formula is satisfied, determining that the synchronization duration is equal to $B_2/8 \times L/S \times N + T$; and switching to the playback instance of the second video source and stopping playing the first video source approximately at an end of the synchronization duration.

7. The method of claim 1, further comprising:

in response to a determination that the first formula $B_2/8 \times L/S \times N+T \leq F$ is not satisfied, determining whether a second formula and a third formulas as follows are satisfied based at least in part on the bandwidth associated with the Web browser and the remaining buffer length of the first video source, $$B_2/8 \times L/S \times N+T > F$$

and $$(B_2+B_1)/8 \leq S/N_2$$

wherein $B_1$ represents a total average code rate of the first video source, $N_2$ represents a speed safety value of acquiring data of the first and second video sources by the Web browser, and in response to a determination that the second formula and the third formula are satisfied, determining that the synchronization duration is equal to $(B_2+B_1)/8 \times L/S \times N+T$.

8. The non-transitory computer-readable storage medium of claim 5, wherein the first video source and the second video source are in any format among a DASH (Dynamic Adaptive Streaming over HTTP) format, a flv (Flash Video) format, and a mp4 (MPEG-4) format.

9. The non-transitory computer-readable storage medium of claim 5, the operations further comprising:

in response to a determination that the first formula $B_2/8 \times L/S \times N+T \leq F$ is not satisfied, determining whether a second formula and a third formulas as follows are satisfied based at least in part on the bandwidth associated with the Web browser and the remaining buffer length of the first video source, $$B_2/8 \times L/S \times N+T > F$$

and $$(B_2+B_1)/8 \leq S/N_2$$

wherein $B_1$ represents a total average code rate of the first video source, $N_2$ represents a speed safety value of acquiring data of the first and second video sources by the Web browser; and in response to a determination that the second formula and the third formula are satisfied, determining that the synchronization duration is equal to $(B_2+B_1)/8 \times L/S \times N+T$.

10. The non-transitory computer-readable storage medium of claim 5, the operations further comprising:

automatically generating the instruction of switching to the second video source based on detecting the playing state of the first video source in real time.

11. The non-transitory computer-readable storage medium of claim 5, the operations further comprising:

generating the instruction of switching to the second video source based on user input received by the Web browser.

12. The device of claim 6, wherein the first video source and the second video source are in any format among a DASH (Dynamic Adaptive Streaming over HTTP) format, a flv (Flash Video) format, and a mp4 (MPEG-4) format.

13. The device of claim 6, the operations further comprising:

in response to a determination that the first formula $B_2/8 \times L/S \times N+T \leq F$ is not satisfied, determining whether a second formula and a third formulas as follows are satisfied based at least in part on the bandwidth associated with the Web browser and the remaining buffer length of the first video source, $$B_2/8 \times L/S \times N+T > F$$

and $$(B_2+B_1)/8 \leq S/N_2$$

wherein $B_1$ represents a total average code rate of the first video source, $N_2$ represents a speed safety value of acquiring data of the first and second video sources by the Web browser; and in response to a determination that the second formula and the third formula are satisfied, determining that the synchronization duration is equal to $(B_2+B_1)/8 \times L/S \times N+T$.

14. The device of claim 6, the operations further comprising:

automatically generating the instruction of switching to the second video source based on detecting the playing state of the first video source in real time.

15. The device of claim 6, the operations further comprising:

generating the instruction of switching to the second video source based on user input received by the Web browser.

* * * * *